United States Patent
Uchino et al.

(10) Patent No.: US 9,008,716 B2
(45) Date of Patent: Apr. 14, 2015

(54) MOBILE STATION

(75) Inventors: Tooru Uchino, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/984,033

(22) PCT Filed: Feb. 14, 2012

(86) PCT No.: PCT/JP2012/053430
§ 371 (c)(1),
(2), (4) Date: Aug. 7, 2013

(87) PCT Pub. No.: WO2012/111676
PCT Pub. Date: Aug. 23, 2012

(65) Prior Publication Data
US 2013/0316758 A1 Nov. 28, 2013

(30) Foreign Application Priority Data
Feb. 14, 2011 (JP) .................. 2011-029235

(51) Int. Cl.
| | |
|---|---|
| *H04B 7/00* | (2006.01) |
| *H04W 52/04* | (2009.01) |
| *H04B 1/04* | (2006.01) |
| *H04W 28/18* | (2009.01) |
| *H04W 52/18* | (2009.01) |
| *H04W 52/36* | (2009.01) |
| *H04W 88/06* | (2009.01) |

(52) U.S. Cl.
CPC .............. *H04W 52/04* (2013.01); *H04B 1/04* (2013.01); *H04W 28/18* (2013.01); *H04W 52/18* (2013.01); *H04W 52/365* (2013.01); *H04W 88/06* (2013.01)

(58) Field of Classification Search
CPC .......................... H04W 52/04; H04W 52/365
USPC ..................... 455/69, 522; 370/318
See application file for complete search history.

(56) References Cited

U.S. PATENT DOCUMENTS

| | | | |
|---|---|---|---|
| 8,249,091 B2 * | 8/2012 | Kim et al. ...................... | 370/432 |
| 2010/0238863 A1 | 9/2010 | Guo et al. | |

FOREIGN PATENT DOCUMENTS

CN 101848487 A 9/2010

OTHER PUBLICATIONS

International Search Report in corresponding International Application No. PCT/JP2012/053430 mailed Mar. 13, 2012 (3 pages).
Written Opinion in corresponding International Application No. PCT/JP2012/053430 mailed Mar. 13, 2012 (3 pages).

(Continued)

Primary Examiner — Raymond Dean
(74) Attorney, Agent, or Firm — Osha Liang LLP (57) ABSTRACT

In a mobile station UE, a PHR transmission unit transmits a PHR to a RAT#1 when "prohibitPHR-Timer_up" is interrupted and when an increment in transmission power or P-MPR in second communication exceeds "dl-PathlossChange" compared with a value in finally transmitting the PHR. When "prohibitPHR-Timer_down" is interrupted and when a decrement in transmission power or a decrement in transmission power or P-MPR in the second communication exceeds "dl_PathlossChange", the PHR transmission unit transmits the PHR to the RAT#1, and "prohibitPHR-Timer_up" is ended in a period shorter than that of "prohibitPHR-Timer_down".

3 Claims, 11 Drawing Sheets

(56) References Cited

OTHER PUBLICATIONS

3GPP TS 36.321 V10.0.0; "3rd Generation Partnership Project; Technical Specification Group Radio Access Network; Evolved Universal Terrestrial Radio Access (E-UTRA); Medium Access Control (MAC) protocol specification (Release 10)"; Dec. 2012 (53 pages).

InterDigital; "PHR Triggering for SSR"; 3GPP TSG RAN WG2 #72-bis, R2-110220; Dublin, Ireland; Jan. 17-21, 2011 (7 pages).

Zte; "Discussion on PHR report"; 3GPP TSG RAN WG2 #70, R2-102817; Montreal, Canada; May 10-14, 2010 (5 pages).

3GPP TS 36.101 V10.0.0; "3rd Generation Partnership Project; Technical Specification Group Radio Access Network; Evolved Universal Terrestrial Radio Access (E-UTRA); User Equipment (UE) radio transmission and reception (Release 10)"; Oct. 2010 (188 pages).

Extended European Search Report in corresponding International Application No. 12747391.6 mailed Jun. 5, 2014 (6 pages).

Office Action issued in corresponding Chinese Application No. 201280007794.3 along with English language communication reporting the same; dated Apr. 21, 2014 (8 pages).

Ericsson; "Summary of e-mail discussion [70#15] LTE CA: PHR Handling", 3GPP TSG-RAN WG2 #70bis, Tdoc R2-103580; Stockholm, Sweden; Jun. 28-Jul. 2, 2010 (17 pages).

Alcatel-Lucent; "UE power variation resulted due to dual transmission"; 3GPP TSG-RAN WG2 Meeting #72, R2-106446; Nov. 15-19, 2010; Jacksonville, USA (2 pages).

Office Action issued in corresponding Chinese Application No. 201280007794.3, mailed Sep. 15, 2014 (8 pages).

* cited by examiner

FIG. 9
Prior Art $$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} \cdots \text{(EQUATION 1)}$$

FIG. 10
Prior Art $$PH_{type1,c}(i) = P_{CMAX,c}(i) - \{10\log_{10}(M_{PUSCH,c}(i)) + P_{O\_PUSCH,c}(j) + \alpha_c(j) \cdot PL_c + \Delta_{TF,c}(i) + f_c(i)\} \cdots \text{(EQUATION 2)}$$

MOBILE STATION

TECHNICAL FIELD

The present invention relates to a mobile station.

BACKGROUND ART

For an LTE (Long Term Evolution) system and an LTE-A (Long Term Evolution-Advanced) system, in an uplink, a UL scheduler of a radio base station eNB is configured to select a transmission format in a PUSCH (Physical Uplink Shared Channel) in each TTI (Transmission Time Interval) and in each mobile station UE.

At this point, the transmission format includes a modulation system, a code rate, and the number of resource blocks. A TBS (Transport Block Size) is uniquely determined by the modulation system, the code rate, and the number of resource blocks.

The radio base station eNB is configured to notify the mobile station UE of the transmission format in the selected PUSCH using "UL grant" in a PDCCH (Physical Downlink Control Channel).

The mobile station UE is configured to transmit an uplink data signal through the PUSCH based on the transmission format of which the mobile station UE is notified through the PDCCH.

The UL scheduler of the general radio base station eNB estimates a PL (Path Loss) between the mobile stations UE, and selects the modulation system and the code rate such that the TBS is enlarged with respect to the mobile station UE having the small PL, thereby keeping a BLER (Block Error Rate) constant irrespective of the PL.

As a result, uplink throughput matching the PL is implemented, and system throughput can be increased while interference to another cell is suppressed.

Figure 9:
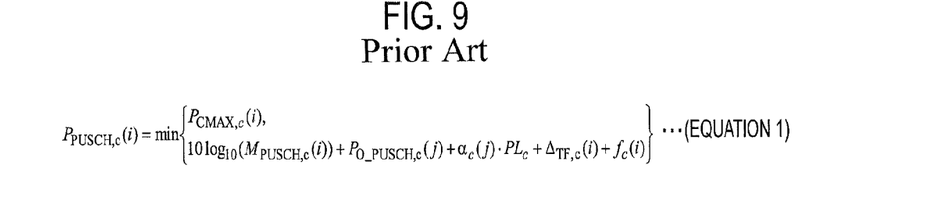
FIG. 9 is an equation used to determine a transmission power of a PUSCH in a conventional mobile station.

The mobile station UE is also configured to determine a transmission power $P_{PUSCH,c}(i)$ in the PUSCH based on (equation 1) in FIG. 9.

Where "$P_{CMAX,c}(i)$" is a maximum transmission power (after consideration of necessary power backoff) of the mobile station UE, "$M_{PUSCH,c}(i)$" is the number of resource blocks, "$P_{o\_PUSCH,c}(i)$" is a power offset value (an annunciation parameter) that becomes a reference, "$\alpha_c(j)$" is an inclination parameter (an annunciation parameter) of Fraction TPC, $PL_c$ is a path loss, $\Delta_{TF,c}(i)$ is a power offset value based on the modulation system and the code rate, and $f_c(i)$ is a closed-loop power control correction value.

The UL scheduler of the radio base station eNB selects the transmission format such that the transmission power $P_{PUSCH,c}(i)$ in the PUSCH of the UE becomes "$P_{CMAX,c}(i)$" or less.

At this point, the UL scheduler of the radio base station eNB estimates the transmission power $P_{PUSCH,c}(i)$ in the PUSCH of the UE using (equation 1).

The BLER becomes larger than a target value, because the transmission power in the PUSCH of the mobile station UE is stuck to "$P_{CMAX,c}(i)$" even if the UL scheduler of the radio base station eNB selects the transmission format in which the transmission power larger than "$P_{CMAX,c}(i)$" is needed.

In the conventional LTE system and LTE-A system, a mechanism that feeds back "PHR (Power Headroom Report)" from the mobile station UE to the radio base station eNB is provided such that the UL scheduler of the radio base station eNB can select the proper transmission format.

At this point, the PHR is a report that reports a surplus transmission power $PH_{type1,c}(i)$ of the mobile station UE. The surplus transmission power $PH_{type1,c}(i)$ of the mobile station UE is obtained using (equation 2) in FIG. 10.

Figure 10:
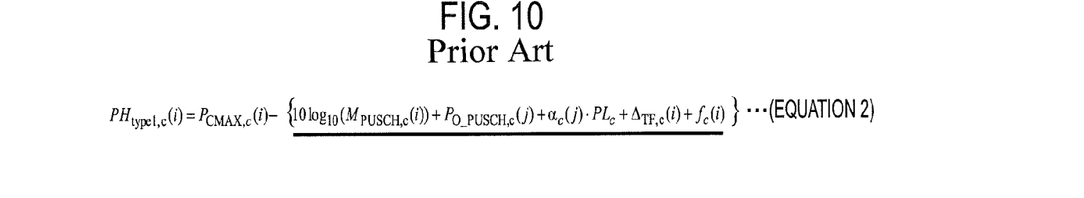
FIG. 10 is an equation used to determine a PH in the conventional mobile station.

A term (1) in (equation 2) is the transmission power in the PUSCH in which the sticking of "$P_{CMAX,c}(i)$" is not considered.

"$P_{CMAX,c}(i)$" is a value in which an MPR (Maximum Power Reduction), an A-MPR (Additional-Maximum Power Reduction), or a P-MPR (P-Maximum Power Reduction) is subtracted from the maximum transmission power (or the maximum transmission power permitted/designated by a network) determined by performance of the mobile station UE.

At this point, the MPR or the A-MPR is a backoff value with respect to the maximum transmission power necessary to satisfy an adjacent channel interference provision.

In 3GPP TS36.101 (v10.0.0), a maximum allowance value of the backoff value is defined in the form of the modulation system, the number of resource blocks, a frequency band, and a position in the frequency band.

The P-MPR is a backoff value with respect to the maximum transmission power necessary to satisfy a SAR (Specific Absorption Rate) provision, which is newly introduced from an LTE-A system (that is, the LTE (Rel-10) system), and the like.

"SAR" defines an amount of energy absorbed in any tissue when a human body is exposed to an electromagnetic wave.

When the mobile station UE simultaneously performs transmission through two RATs (Radio Access Technologies), because an amount of radio wave generated from both the RATs needs to be considered, sometimes the SAR provision is satisfied only by the transmission power in one of the RATs, and possibly the backoff is performed to the maximum transmission power in the other RAT.

For example, in the case that sound communication through a cdma2000 system and data communication through the LTE system are simultaneously conducted, it is considered that the backoff is not performed to the transmission power in the cdma2000 system in order to maintain sound quality while the backoff is applied to the transmission power in the LTE system in order to satisfy the SAR provision.

At this point, because the sound communication through the cdma2000 system is a multi-rate, the backoff varies from moment to moment with respect to the transmission power in the LTE system when the transmission power varies from moment to moment.

Figure 11:
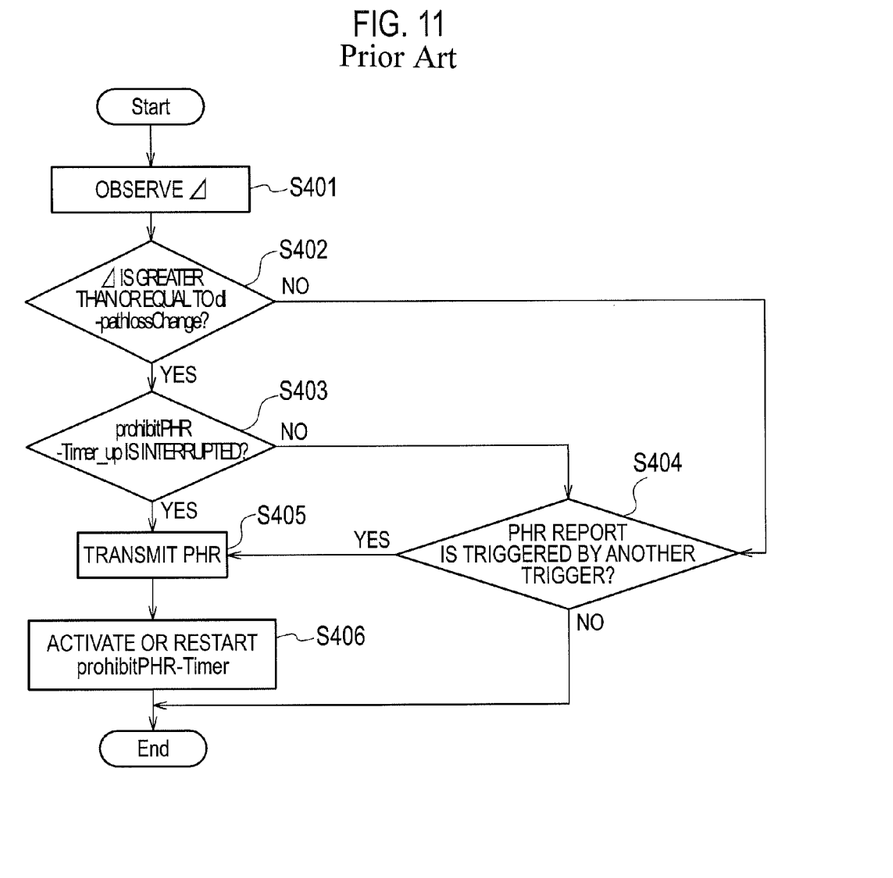
FIG. 11 is a flowchart illustrating the operation of the conventional mobile station.

In the LTE-A system, the mobile station UE is configured to transmit the PHR when a variation $\Delta$ in "$P_{CMAX,c}(i)$" or a variation $\Delta$ in P-MPR, which is based on the P-MPR compared with a value in finally transmitting the PHR while "prohibitPHR-Timer" is interrupted, exceeds "dl-PathlossChange" (see FIG. 11).

The mobile station UE is configured to activate "prohibitPHR-Timer" when transmitting the PHR, and configured not to transmit the PHR until "prohibitPHR-Timer" is ended (see FIG. 11).

Figure 12:
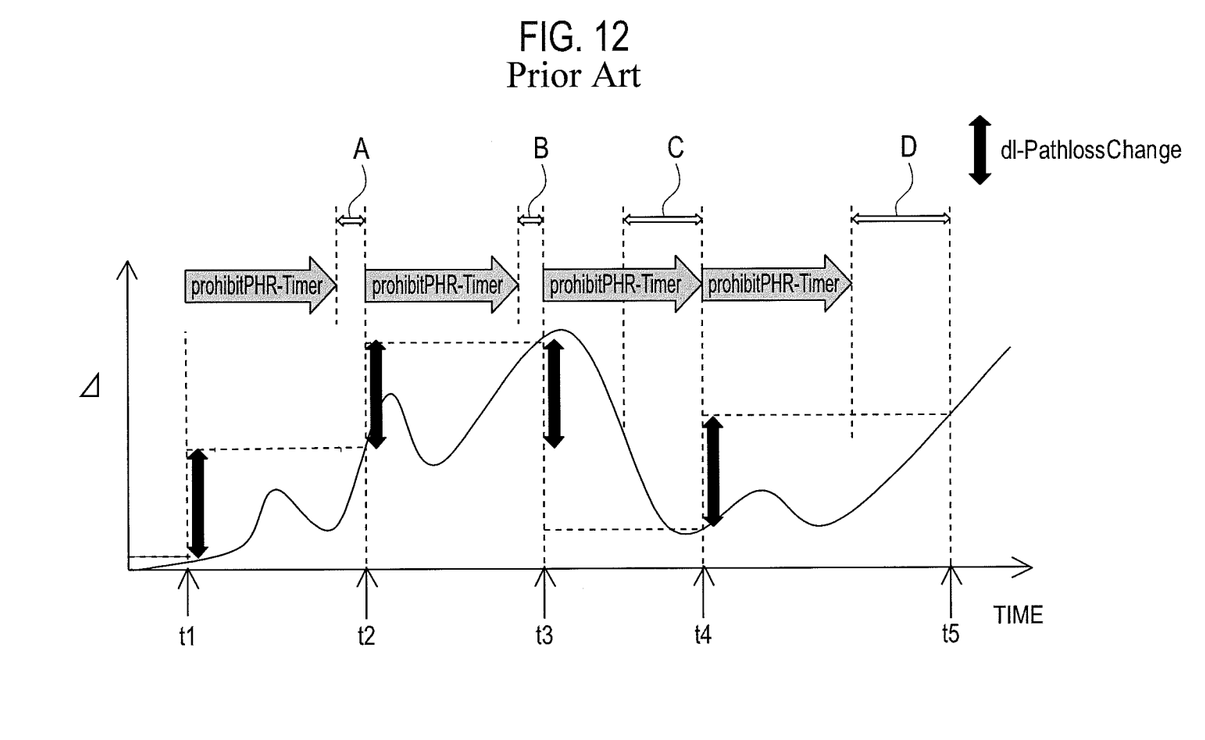
FIG. 12 is a view illustrating the operation of the conventional mobile station.

Specifically, in an example in FIG. 12, the mobile station UE is configured to transmit the PHR to the radio base station eNB at clock times t1 to t5.

At this point, the mobile station UE does not transmit the PHR, because the variation $\Delta$ does not exceed "dl-PathlossChange" although "prohibit PHR-Timer" is ended in periods A, B, and D.

The mobile station UE does not transmit the PHR, because "prohibitPHR-Timer" is not ended although the variation $\Delta$ exceeds "dl-PathlossChange" in a period C.

CITATION LIST

Non-Patent Literature

Non-Patent Literature 1: 3GPP TS36.321 (v10.0.0)

SUMMARY OF INVENTION

Technical Problem

However, in the conventional mobile communication system, unfortunately the mobile station UE has a possibility of being not able to transmit the PHR even in timing in which the transmission format should be changed according to a change in transmission power in the communication through the cdma2000 system or a change in P-MPR (and a change in "$P_{CMAX,c}(i)$" as a result of the change in P-MPR).

Figure 13:
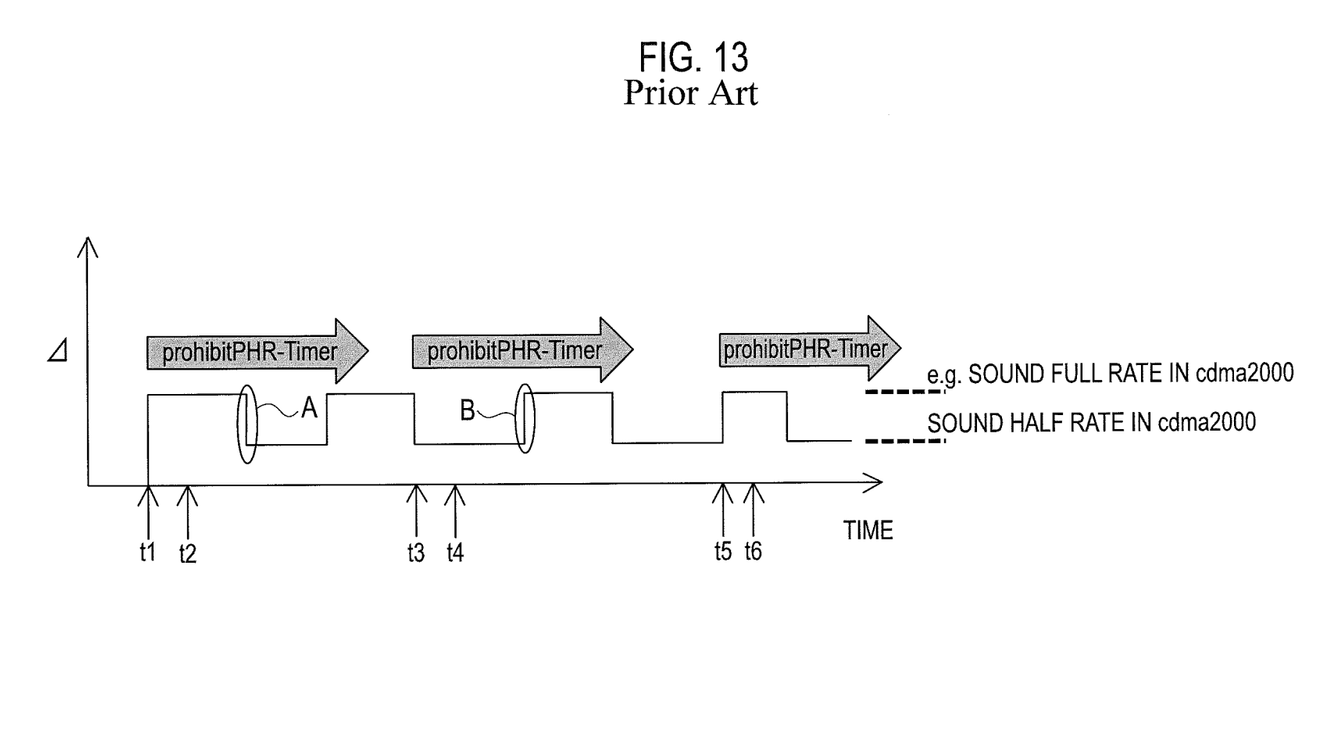
FIG. 13 is a view illustrating the operation of the conventional mobile station.

For example, in FIG. 13, the mobile station UE transmits the PHR to activate "prohibitPHR-Timer" at the clock time t1, because the transmission power in the communication through the cdma2000 system or the P-MPR (and "$P_{CMAX,c}(i)$") increases beyond "dl-PathlossChange".

At the clock time t2, the radio base station eNB decreases the code rate and the number of resource blocks based on the PHR.

At a clock time A, the mobile station UE does not transmit the PHR, because "prohibitPHR-Timer" is not ended although the transmission power in the communication through the cdma2000 system or the P-MPR (and "$P_{CMAX,c}(i)$") decreases beyond "dl-PathlossChange". As a result, the radio base station eNB cannot increase the code rate and the number of resource blocks based on the PHR.

Then, at the clock time t3, the mobile station UE transmits the PHR to activate "prohibitPHR-Timer", because the transmission power in the communication through the cdma2000 system or the P-MPR (and "$P_{CMAX,c}(i)$") decreases beyond "dl-PathlossChange" while "prohibitPHR-Timer" is ended.

At the clock time t4, the radio base station eNB increases the code rate and the number of resource blocks based on the PHR.

At a clock time B, the mobile station UE does not transmit the PHR, because "prohibitPHR-Timer" is not ended although the transmission power in the communication through the cdma2000 system or the P-MPR (and "$P_{CMAX,c}(i)$") increases beyond "dl-PathlossChange". As a result, the radio base station eNB cannot decrease the code rate and the number of resource blocks based on the PHR.

Then, at the clock time t5, the mobile station UE transmits the PHR to activate "prohibitPHR-Timer", because the transmission power in the communication through the cdma2000 system or the P-MPR (and "$P_{CMAX,c}(i)$") increases beyond "dl-PathlossChange" while "prohibitPHR-Timer" is ended.

At the clock time t6, the radio base station eNB decreases the code rate and the number of resource blocks based on the PHR.

At this point, in the case like the clock time A, the mobile station UE can conduct uplink communication without any difficulty although frequency use efficiency is degraded, because the code rate and the number of resource blocks, which are used in the uplink communication, remain small.

On the other hand, in the case like the clock time B, unfortunately there is a possibility of frequently generating data error, because the code rate and the number of resource blocks, which are used in the uplink communication, remain large.

The present invention has been devised to solve the problems described above, and an object thereof is to provide a mobile station that, when two pieces of communication through the two RATs are performed, can properly perform the backoff in one of the pieces of communication in consideration of the transmission power in the other piece of communication.

Solution to Problem

In accordance with a first aspect of the present invention, a mobile station configured to be able to simultaneously conduct first communication through a first radio access network and second communication through a second radio access network, the mobile station including a reporting unit configured to report a surplus transmission power of the mobile station to the first radio access network and a timer management unit configured to manage a first timer and a second timer, the first timer and the second timer being activated when the surplus transmission power is reported, wherein the reporting unit is configured to report the surplus transmission power to the first radio access network when the first timer is interrupted and when an increment in transmission power in the second communication or an increment in maximum transmission power reduction value determined based on the transmission power in the second communication exceeds a predetermined amount compared with a value in finally reporting the surplus transmission power, the reporting unit is configured to report the surplus transmission power to the first radio access network when the second timer is interrupted and when the decrement in transmission power in the second communication or the decrement in maximum transmission power reduction value exceeds the predetermined amount compared with the value in finally reporting the surplus transmission power, and the first timer is configured to be ended in the period shorter than that of the second timer.

In accordance with a second aspect of the present invention, a mobile station configured to be able to simultaneously conduct first communication through a first radio access network and second communication through a second radio access network, the mobile station including a reporting unit configured to report a surplus transmission power of the mobile station to the first radio access network and a timer management unit configured to manage a timer, the timer being activated when the surplus transmission power is reported, wherein the reporting unit is configured not to the report surplus transmission power to the first radio access network when the timer is activated, and the reporting unit is configured to report the surplus transmission power to the first radio access network when a state in which a decrement in transmission power in the second communication or a decrement in maximum transmission power reduction value determined based on the transmission power in the second communication exceeds a predetermined amount continues for a predetermined period, even if the timer is interrupted.

In accordance with a third aspect of the present invention, a mobile station configured to be able to simultaneously conduct first communication through a first radio access network and second communication through a second radio access network, the mobile station including a reporting unit configured to report a surplus transmission power of the mobile station to the first radio access network and a timer management unit configured to manage a timer, the timer being activated when the surplus transmission power is reported, wherein the reporting unit is configured to report the surplus transmission power to the first radio access network when the timer is interrupted and when the increment in transmission power in the second communication or the increment in maximum transmission power reduction value determined based on the transmission power in the second communication exceeds a first predetermined amount compared with a value in finally reporting the surplus transmission power, the reporting unit is configured to report the surplus transmission power to the first radio access network when the timer is interrupted and when the decrement in transmission power in the second communication or the decrement in maximum transmission power reduction value exceeds a second predetermined amount compared with the value in finally reporting the surplus transmission power, and the first predetermined amount is configured to be smaller than the second predetermined amount.

Advantageous Effect of Invention

As described above, when two pieces of communication through the two RATs are performed, the present invention can provide a mobile station that can properly perform the backoff in one of the pieces of communication in consideration of a transmission power in the other piece of communication.

DESCRIPTION OF EMBODIMENT (Mobile Communication System According to First Embodiment of the Present Invention)

A mobile communication system according to a first embodiment of the present invention will be described with reference to FIGS. 1 to 4.

Figure 1:
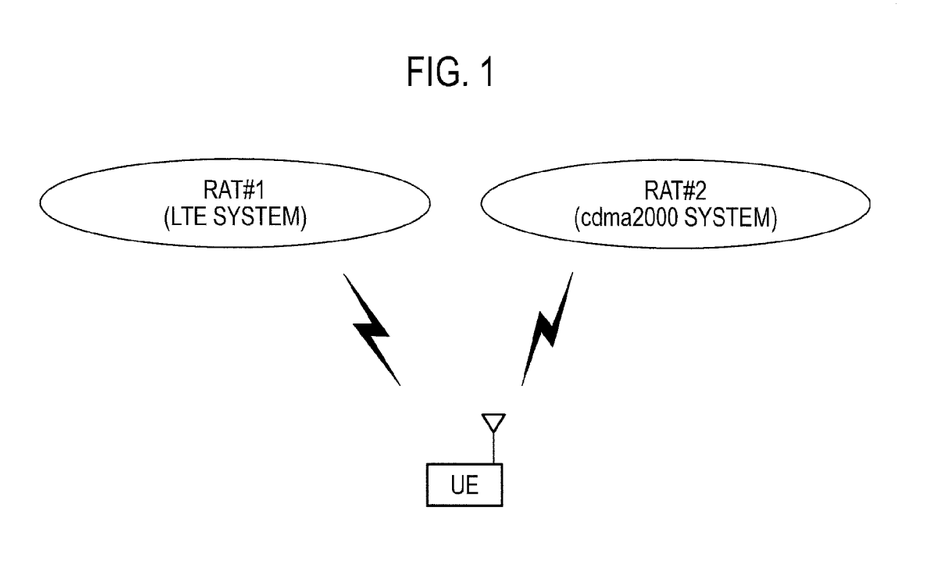
FIG. 1 is an entire configuration diagram of a mobile communication system according to a first embodiment of the present invention.

As illustrated in FIG. 1, an RAT#1 of the LTE system and an RAT#2 of the cdma2000 system are accommodated in the mobile communication system of the embodiment. The present invention can also be applied to a mobile communication system in which the RAT#1 and the RAT#2 are accommodated.

A mobile station UE of the embodiment is configured to be able to simultaneously conduct first communication (for example, data communication) through the RAT#1 and second communication (for example, sound communication) through the RAT#2.

Figure 2:
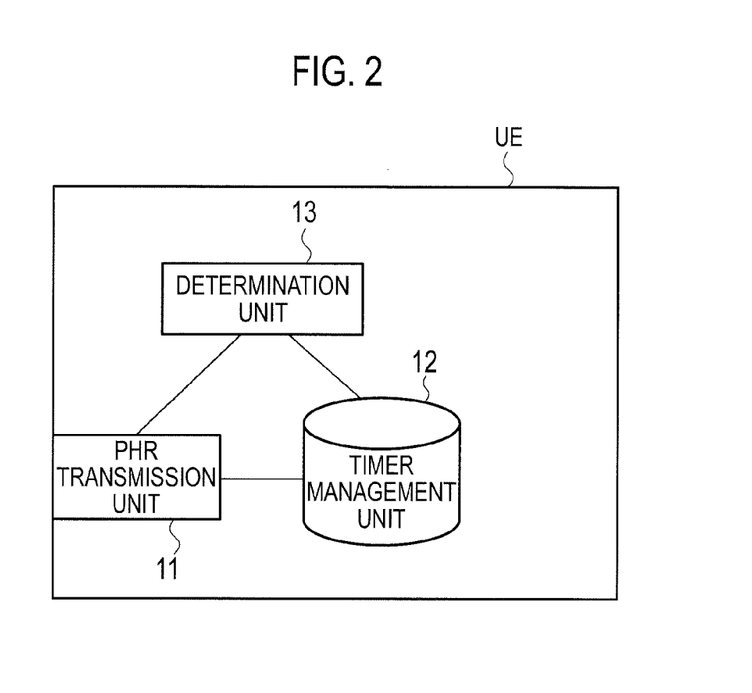
FIG. 2 is a functional block diagram of a mobile station according to the first embodiment of the present invention.

As illustrated in FIG. 2, the mobile station UE includes a PHR transmission unit 11, a timer management unit 12, and a determination unit 13.

The PHR transmission unit 11 is configured to transmit a PHR to the RAT#1 (that is, a radio base station eNB) in response to an instruction issued by the determination unit 13.

The timer management unit 12 is configured to manage "prohibitPHR-Timer_up" and "prohibitPHR-Timer_down", which are activated when the PHR is transmitted.

The determination unit 13 is configured to determine whether the PHR transmission unit 11 should transmit the PHR, and to issue the instruction to the PHR transmission unit 11 to transmit the PHR.

Specifically, the determination unit 13 is configured to determine that the PHR transmission unit 11 should transmit the PHR, when "prohibitPHR-Timer_up" is interrupted, and when an increment in transmission power in the second communication, an increment in P-MPR, an increment in MPR, an increment in A-MPR, a decrement in "$P_{CMAX,c}(i)$" by P-MPR, a decrement in "$P_{CMAX,c}(i)$" by MPR, or a decrement in "$P_{CMAX,c}(i)$" by A-MPR exceeds "dl-PathlossChange" compared with a value in finally transmitting the PHR.

At this point, it is assumed that the P-MPR is a maximum transmission power reduction value determined based on the transmission power in the second communication.

"dl-PathlossChange" may be set in each RAT in which the simultaneous communication is conducted, or flexibly be set according to a variation in transmission power, a variation (and "$P_{CMAX,c}(i)$") in P-MPR, or the like.

The determination unit 13 is configured to determine that the PHR transmission unit 11 should transmit the PHR, when "prohibitPHR-Timer_down" is interrupted, and when a decrement in transmission power in the second communication, a decrement in P-MPR, a decrement in MPR, a decrement in A-MPR, an increment in "$P_{CMAX,c}(i)$" by the P-MPR, an increment in "$P_{CMAX,c}(i)$" by the MPR, or an increment in "$P_{CMAX,c}(i)$" by the A-MPR exceeds "dl-PathlossChange" compared with a value in finally transmitting the PHR.

Otherwise, the determination unit 13 is configured to determine that the PHR transmission unit 11 should not transmit the PHR.

At this point, "prohibitPHR-Timer_up" is configured to be ended in a period shorter than that of "prohibitPHR-Timer_down".

Figure 3:
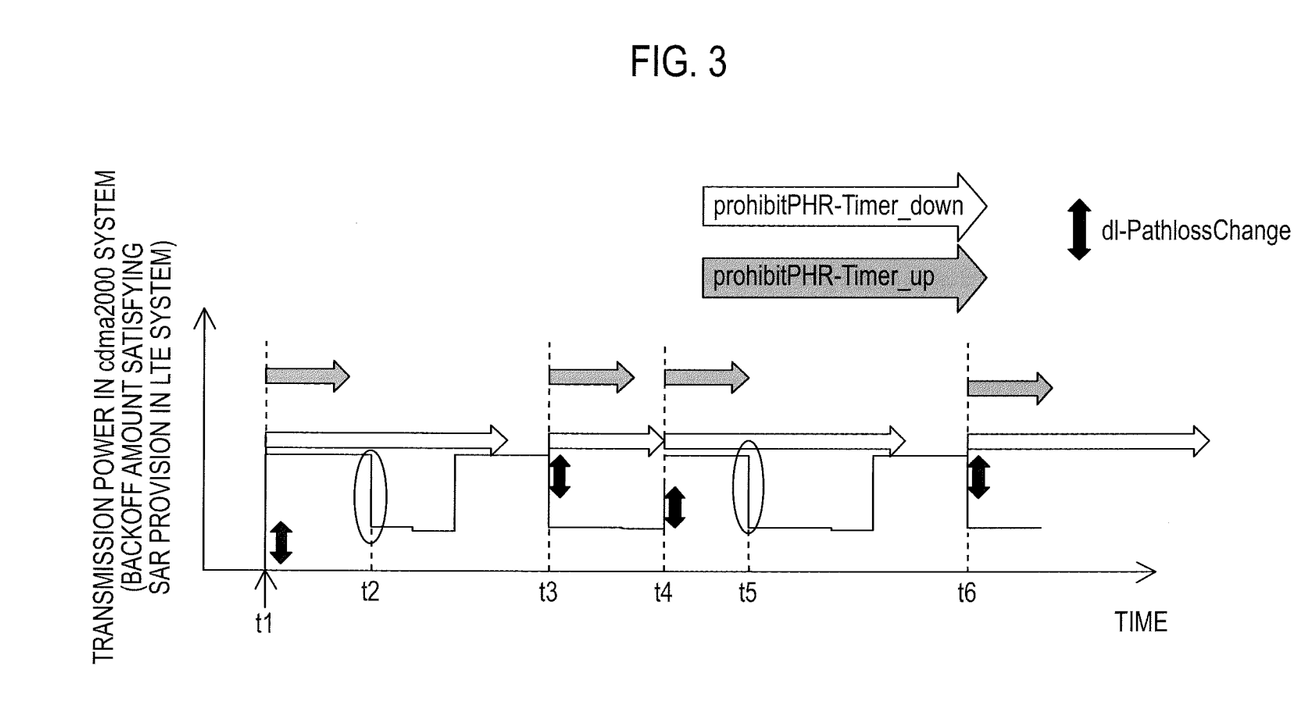
FIG. 3 is a view illustrating the operation of the mobile station according to the first embodiment of the present invention.

In an example in FIG. 3, at a clock time t1, the mobile station UE transmits the PHR to the radio base station eNB to activate "prohibitPHR-Timer_up" and "prohibitPHR-Timer_down" because the increment in transmission power in the second communication or the increment in P-MPR (and "$P_{CMAX,c}(i)$") exceeds "dl-PathlossChange".

At a clock time t2, the mobile station UE does not transmit the PHR to the radio base station eNB, because "prohibitPHR-Timer_down" is not ended although the decrement in transmission power in the second communication or the decrement in P-MPR (and "$P_{CMAX,c}(i)$") exceeds "dl-PathlossChange" compared with the value at the clock time t1.

At a clock time t3, the mobile station UE transmits the PHR to the radio base station eNB to activate "prohibitPHR-Timer_up" and "prohibitPHR-Timer_down", because "prohibitPHR-Timer_down" is ended, and because the decrement in transmission power in the second communication or the decrement in P-MPR (and "$P_{CMAX,c}(i)$") exceeds "dl-PathlossChange" compared with the value at the clock time t1.

At a clock time t4, the mobile station UE transmits the PHR to the radio base station eNB to activate "prohibitPHR-Timer_up" and "prohibitPHR-Timer_down", because "prohibitPHR-Timer_up" is ended (although "prohibitPHR-Timer_down" is not ended), and because the increment in transmission power in the second communication or the increment in P-MPR (and "$P_{CMAX,c}(i)$") exceeds "dl-PathlossChange" compared with the value at the clock time t3.

At a clock time t5, the mobile station UE does not transmit the PHR to the radio base station eNB, because "prohibitPHR-Timer_down" is not ended although the decrement in transmission power in the second communication or the decrement in P-MPR (and "$P_{CMAX,c}(i)$") exceeds "dl-PathlossChange" compared with the value at the clock time t4.

At a clock time t6, the mobile station UE transmits the PHR to the radio base station eNB to activate "prohibitPHR-Timer_up" and "prohibitPHR-Timer_down", because "prohibitPHR-Timer_up" is ended, and because the increment in transmission power in the second communication or the increment in P-MPR (and "$P_{CMAX,c}(i)$") exceeds "dl-PathlossChange" compared with the value at the clock time t4.

An example of the operation of the mobile station UE of the embodiment will be described below with reference to FIG. 4.

Figure 4:
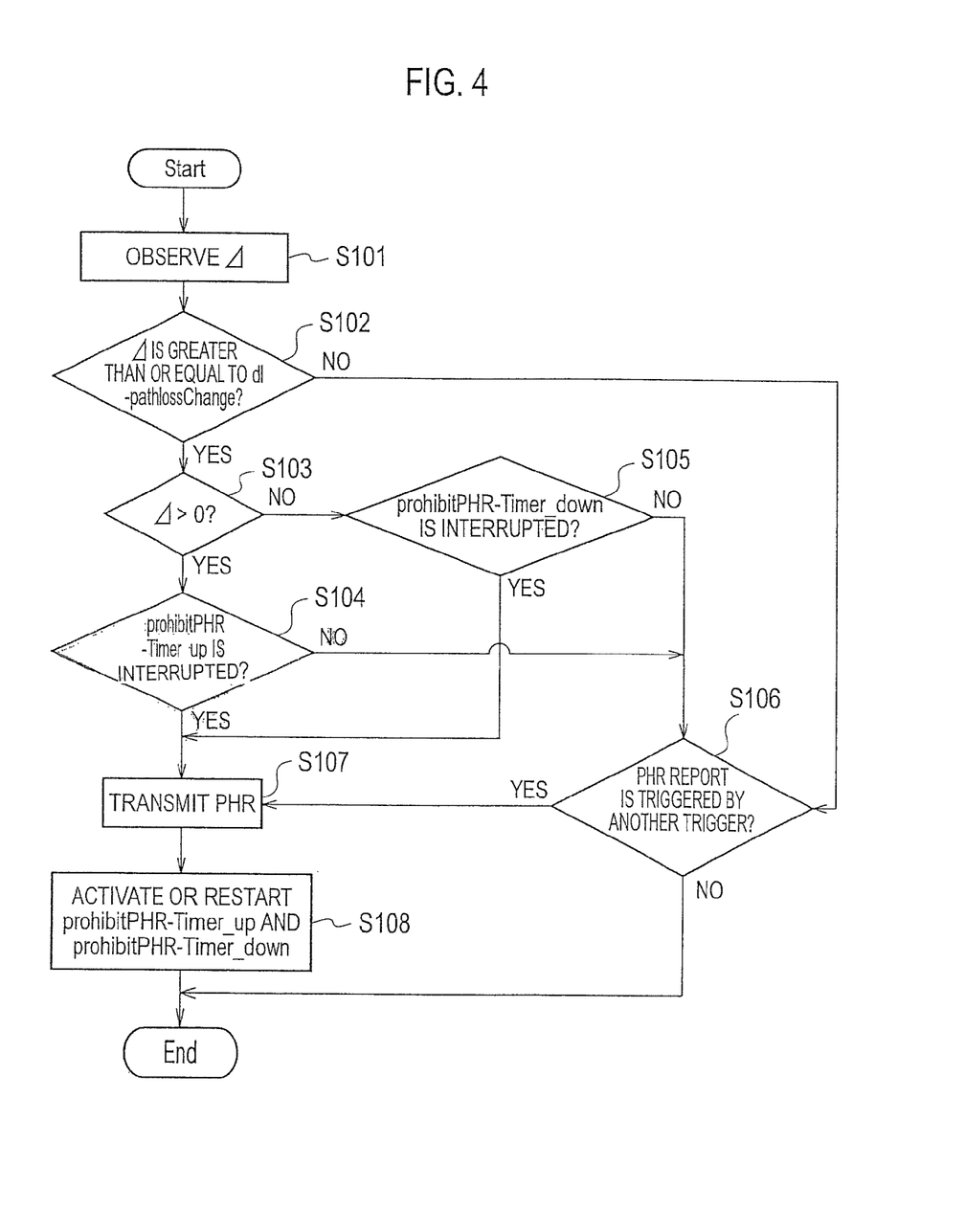
FIG. 4 is a flowchart illustrating the operation of the mobile station according to the first embodiment of the present invention.

As illustrated in FIG. 4, the mobile station UE observes a variation Δ in transmission power in the second communication or a variation Δ in P-MPR (and "$P_{CMAX,c}(i)$") compared with the value in finally transmitting the PHR in Step S101, and the mobile station UE determines whether the variation Δ exceeds "dl-PathlossChange" in Step S102.

The operation goes to Step S103 in the case of "YES", and the operation goes to Step S106 in the case of "NO".

In Step S103, the mobile station UE determines whether the variation Δ is greater than "0".

The operation goes to Step S104 in the case of "YES", and the operation goes to Step S105 in the case of "NO".

In Step S104, the mobile station UE determines whether "prohibitPHR-Timer_up" is interrupted.

The operation goes to Step S107 in the case of "YES", and the operation goes to Step S106 in the case of "NO".

In Step S105, the mobile station UE determines whether "prohibitPHR-Timer_down" is interrupted.

The operation goes to Step S107 in the case of "YES", and the operation goes to Step S106 in the case of "NO".

In Step S106, the mobile station UE determines whether the PHR should be transmitted by another trigger (for example, a periodic transmission trigger of the PHR, and a transmission trigger in the case that the PHR function is activated).

The operation goes to Step S107 in the case of "YES", and the operation is ended in the case of "NO".

In Step S107, the mobile station UE transmits the PHR to the radio base station eNB.

In Step S108, "prohibitPHR-Timer_up" and "prohibitPHR-Timer_down" are activated (or restarted).

In FIG. 4, Step S107 may be performed after Step S108. In FIG. 4, Step S102 may be performed after Step S104 or S105.

According to the mobile communication system of the first embodiment of the present invention, the possibility of frequently generating the data error caused by performing the transmission in the transmission format in which the mobile station UE is improper can be avoided using "prohibitPHR-Timer_up" and "prohibitPHR-Timer_down", in which times to the end differ from each other.

First Modification

A mobile communication system according to a first modification of the present invention will be described with reference to FIGS. 5 and 6. The mobile communication system of the first modification of the present invention will be described below by focusing on a difference with the mobile communication system of the above-described first embodiment.

The timer management unit 12 is configured to manage "prohibitPHR-Timer" activated in transmitting the PHR.

The determination unit 13 is configured to determine that the PHR transmission unit 11 should not transmit the PHR when "prohibitPHR-Timer" is activated.

The determination unit 13 is also configured to determine that the PHR transmission unit 11 should transmit the PHR, when the decrement in transmission power in the second communication, the decrement in P-MPR, the decrement in MPR, the decrement in A-MPR, the increment in "$P_{CMAX,c}(i)$" by the P-MPR, the increment in "$P_{CMAX,c}(i)$" by the MPR, or the increment in "$P_{CMAX,c}(i)$" by the A-MPR continuously exceeds "dl-PathlossChange" for a period of a TTT (Time To Trigger) compared with the value in finally transmitting the PHR, even if "prohibitPHR-Timer" is interrupted.

The determination unit 13 may continuously monitor the period of the TTT like timer control, or discretely monitor the period of the TTT like the number of protection stages.

The determination unit 13 may be configured to determine that the PHR transmission unit 11 should transmit the PHR, when the increment in transmission power in the second communication, the increment in P-MPR, the increment in MPR, the increment in A-MPR, the decrement in "$P_{CMAX,c}(i)$" by the P-MPR, the decrement in "$P_{CMAX,c}(i)$" by the MPR, or the decrement in "$P_{CMAX,c}(i)$" by the A-MPR continuously exceeds "dl-PathlossChange" for the period of the TTT compared with the value in finally transmitting the PHR, even if "prohibitPHR-Timer" is interrupted.

"dl-PathlossChange" may be set in each RAT in which the simultaneous communication is conducted, or flexibly be set according to the variation in transmission power, the variation (and "$P_{CMAX,c}(i)$") in P-MPR, or the like.

Figure 5:
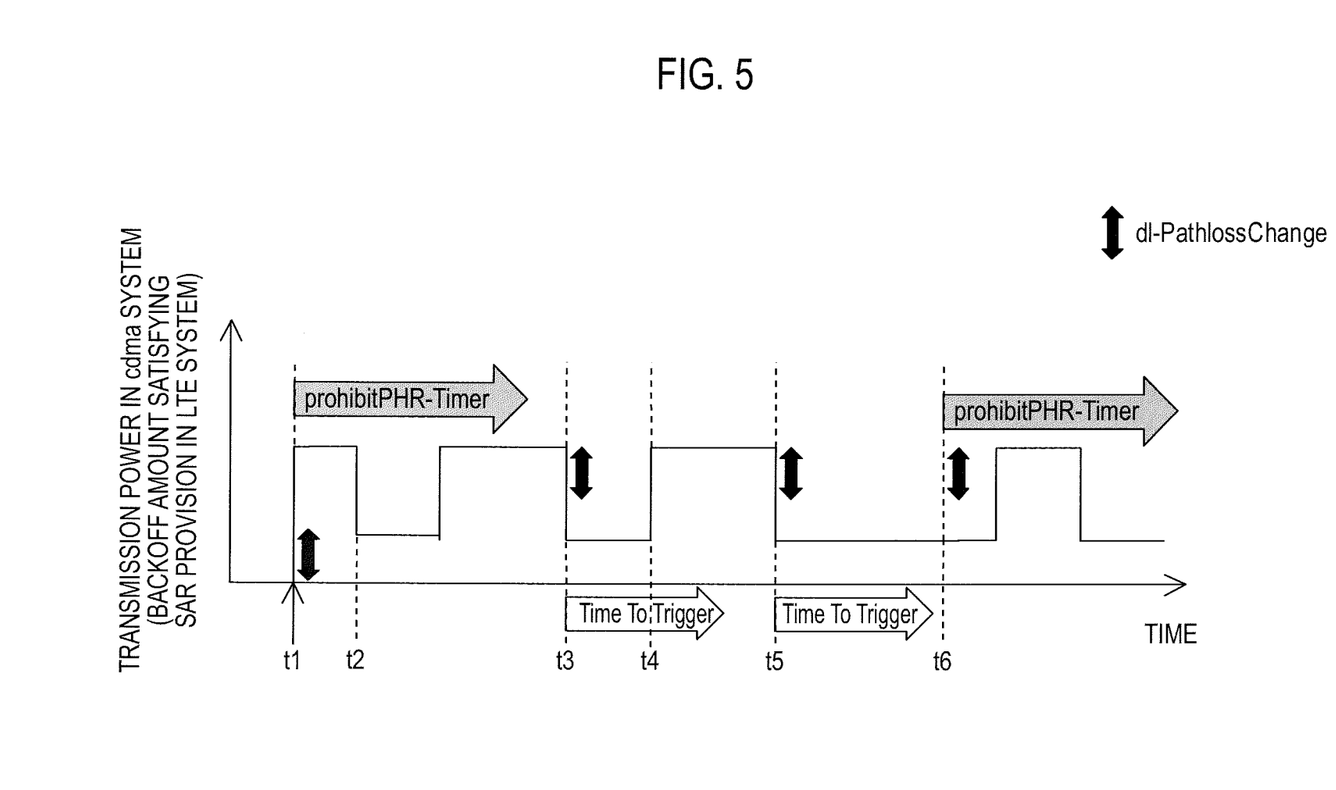
FIG. 5 is a view illustrating the operation of a mobile station according to a first modification of the present invention.

In an example of FIG. 5, at the clock time t1, the mobile station UE transmits the PHR to the radio base station eNB to activate "prohibitPHR-Timer" because the increment in transmission power in the second communication or the increment in P-MPR (and "$P_{CMAX,c}(i)$") exceeds "dl-PathlossChange".

At the clock time t2, the mobile station UE does not transmit the PHR to the radio base station eNB, because "prohibitPHR-Timer" is not ended although the decrement in transmission power in the second communication or the decrement in P-MPR (and "$P_{CMAX,c}(i)$") exceeds "dl-PathlossChange" compared with the value at the clock time t1.

At the clock time t3, the mobile station UE observes the variation Δ in the period of the TTT, because the decrement in transmission power in the second communication or the decrement in P-MPR (and "$P_{CMAX,c}(i)$") exceeds "dl-PathlossChange".

At the clock time t4, the mobile station UE does not transmit the PHR to the radio base station eNB, because the state in which the decrement in transmission power in the second communication or the decrement in P-MPR (and "$P_{CMAX,c}(i)$") exceeds "dl-PathlossChange" does not continue for the period in the TTT by the increase of the transmission power in the second communication or the P-MPR (and "$P_{CMAX,c}(i)$").

At the clock time t5, the mobile station UE starts the observation of the variation Δ in the period of the TTT, because the decrement in transmission power in the second communication or the decrement in P-MPR (and "$P_{CMAX,c}(i)$") exceeds "dl-PathlossChange".

At the clock time t6, the mobile station UE transmits the PHR to the radio base station eNB to activate "prohibitPHR-Timer", because the state in which the decrement in transmission power in the second communication or the decrement in P-MPR (and "$P_{CMAX,c}(i)$") exceeds "dl-PathlossChange" continues for the period in the TTT.

An example of the operation of the mobile station UE of the embodiment will be described below with reference to FIG. 6.

Figure 6:
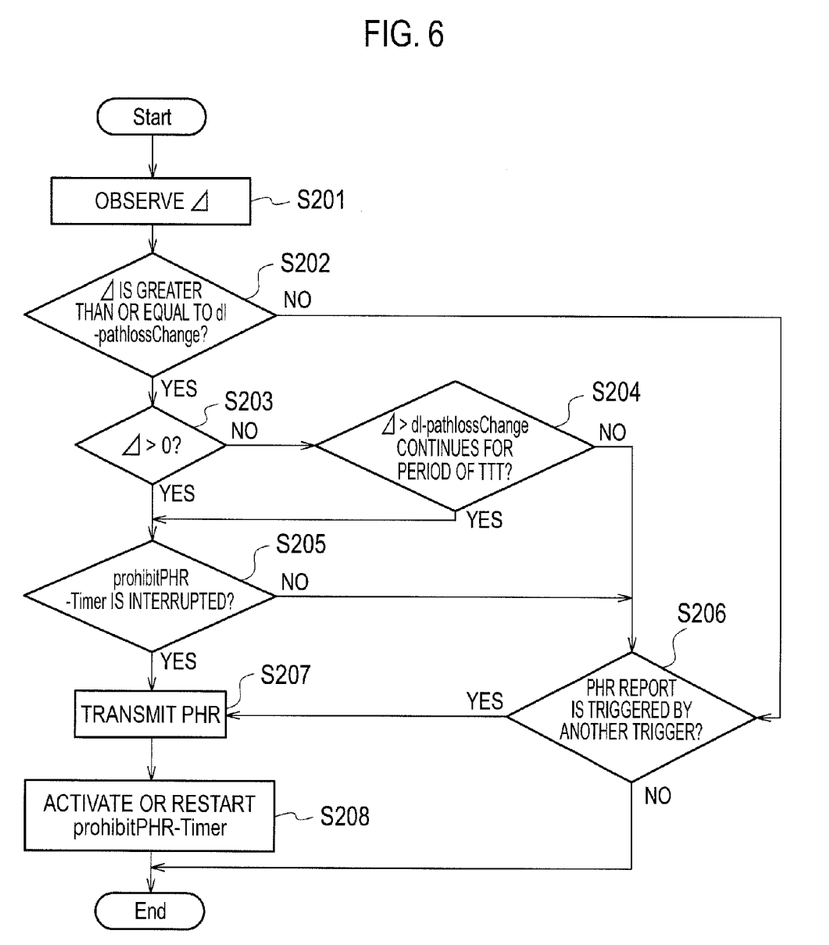
FIG. 6 is a flowchart illustrating the operation of the mobile station according to the first modification of the present invention.

As illustrated in FIG. 6, the mobile station UE observes the variation Δ in transmission power in the second communication or the variation Δ in P-MPR (and "$P_{CMAX,c}(i)$") compared with the value in finally transmitting the PHR in Step S201, and the mobile station UE determines whether the variation Δ exceeds "dl-PathlossChange" in Step S202.

The operation goes to Step S203 in the case of "YES", and the operation goes to Step S206 in the case of "NO".

In Step S203, the mobile station UE determines whether the variation Δ is greater than "0".

The operation goes to Step S205 in the case of "YES", and the operation goes to Step S204 in the case of "NO".

In Step S204, the mobile station UE determines whether the state in which the decrement in transmission power in the second communication or the decrement in P-MPR (and "$P_{CMAX,c}(i)$") exceeds "dl-PathlossChange" continues for the period of the TTT.

The operation goes to Step S205 in the case of "YES", and the operation goes to Step S206 in the case of "NO".

In Step S205, the mobile station UE determines whether "prohibitPHR-Timer" is interrupted.

The operation goes to Step S207 in the case of "YES", and the operation goes to Step S206 in the case of "NO".

In Step S206, the mobile station UE determines whether the PHR should be transmitted by another trigger (for example, the periodic transmission trigger of the PHR, and the transmission trigger in the case that the PHR function is activated).

The operation goes to Step S207 in the case of "YES", and the operation is ended in the case of "NO".

In Step S207, the mobile station UE transmits the PHR to the radio base station eNB.

In Step S208, "prohibitPHR-Timer" is activated (or restarted).

In FIG. 6, Step S207 may be performed after Step S208. In FIG. 6, Step S202 may be performed after Step S205.

According to the mobile communication system of the first modification of the present invention, the mobile station UE is configured to transmit the PHR when the state in which the decrement in transmission power in the second communication or the decrement in P-MPR (and "$P_{CMAX,c}(i)$") exceeds "dl-PathlossChange" continues for the period of the TTT. Therefore, the state in which the code rate or the number of resource blocks, which are used in the uplink communication, remains large can be resolved in preference to the state in which the code rate or the number of resource blocks, which are used in the uplink communication, remains small, and the possibility of frequently generating the data error caused by performing the transmission in the transmission format in which the mobile station UE is improper can be avoided.

Second Modification

A mobile communication system according to a second modification of the present invention will be described with reference to FIGS. 7 and 8. The mobile communication system of the second modification of the present invention will be described below by focusing on a difference with the mobile communication system of the above-described first embodiment.

The timer management unit 12 is configured to manage "prohibitPHR-Timer" activated in transmitting the PHR.

The determination unit 13 is configured to determine that the PHR transmission unit 11 should transmit the PHR, when "prohibitPHR-Timer" is interrupted, and when the increment in transmission power in the second communication, the increment in P-MPR, the increment in MPR, the increment in A-MPR, the decrement in "$P_{CMAX,c}(i)$" by the P-MPR, the decrement in "$P_{CMAX,c}(i)$" by the MPR, or the decrement in "$P_{CMAX,c}(i)$" by the A-MPR exceeds "dl-PathlossChange_up" compared with the value in finally transmitting the PHR.

The determination unit 13 is configured to determine that the PHR transmission unit 11 should transmit the PHR, when "prohibitPHR-Timer" is interrupted, and when the decrement in transmission power in the second communication, the decrement in P-MPR, the decrement in MPR, the decrement in A-MPR, the increment in "$P_{CMAX,c}(i)$" by the P-MPR, the increment in "$P_{CMAX,c}(i)$" by the MPR, or the increment in "$P_{CMAX,c}(i)$" by the A-MPR exceeds "dl-PathlossChange_down" compared with the value in finally transmitting the PHR.

"dl-PathlossChange_up" is configured to be smaller than "dl-PathlossChange_down".

"dl-PathlossChange_up" and "dl-PathlossChange_down" may be set in each RAT in which the simultaneous communication is conducted, or flexibly be set according to the variation in transmission power, the variation (and "$P_{CMAX,c}(i)$") in P-MPR, or the like.

Figure 7:
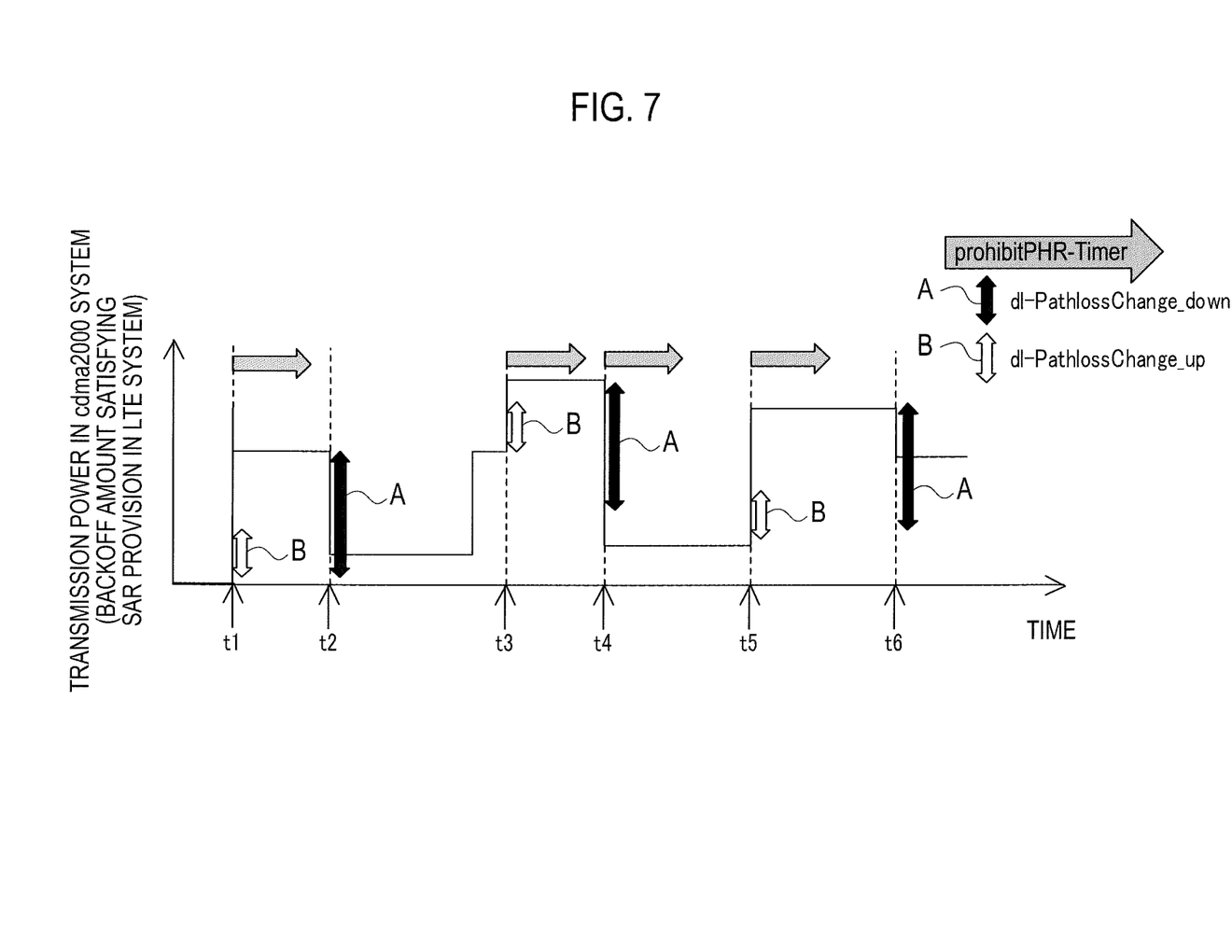
FIG. 7 is a view illustrating the operation of a mobile station according to a second modification of the present invention.

In an example of FIG. 7, at the clock time t1, the mobile station UE transmits the PHR to the radio base station eNB to activate "prohibitPHR-Timer" because the increment in transmission power in the second communication or the increment in P-MPR (and "$P_{CMAX,c}(i)$") exceeds "dl-PathlossChange_up".

At the clock time t2, the mobile station UE does not transmit the PHR to the radio base station eNB, because the decrement in transmission power in the second communication or the decrement in P-MPR (and "$P_{CMAX,c}(i)$") does not exceed "dl-PathlossChange_down".

At the clock time t3, the mobile station UE transmits the PHR to the radio base station eNB to activate "prohibitPHR-Timer", because the increment in transmission power in the second communication or the increment in P-MPR (and "$P_{CMAX,c}(i)$") exceeds "dl-PathlossChange_up".

At the clock time t4, the mobile station UE transmits the PHR to the radio base station eNB to activate "prohibitPHR-Timer", because the decrement in transmission power in the second communication or the decrement in P-MPR (and "$P_{CMAX,c}(i)$") exceeds "dl-PathlossChange_down".

At the clock time t5, the mobile station UE transmits the PHR to the radio base station eNB to activate "prohibitPHR-Timer", because the increment in transmission power in the second communication or the increment in P-MPR (and "$P_{CMAX,c}(i)$") exceeds "dl-PathlossChange_up".

At the clock time t6, the mobile station UE does not transmit the PHR to the radio base station eNB, because the decrement in transmission power in the second communication or the decrement in P-MPR (and "$P_{CMAX,c}(i)$") does not exceed "dl-PathlossChange_down".

An example of the operation of the mobile station UE of the embodiment will be described below with reference to FIG. 8.

Figure 8:
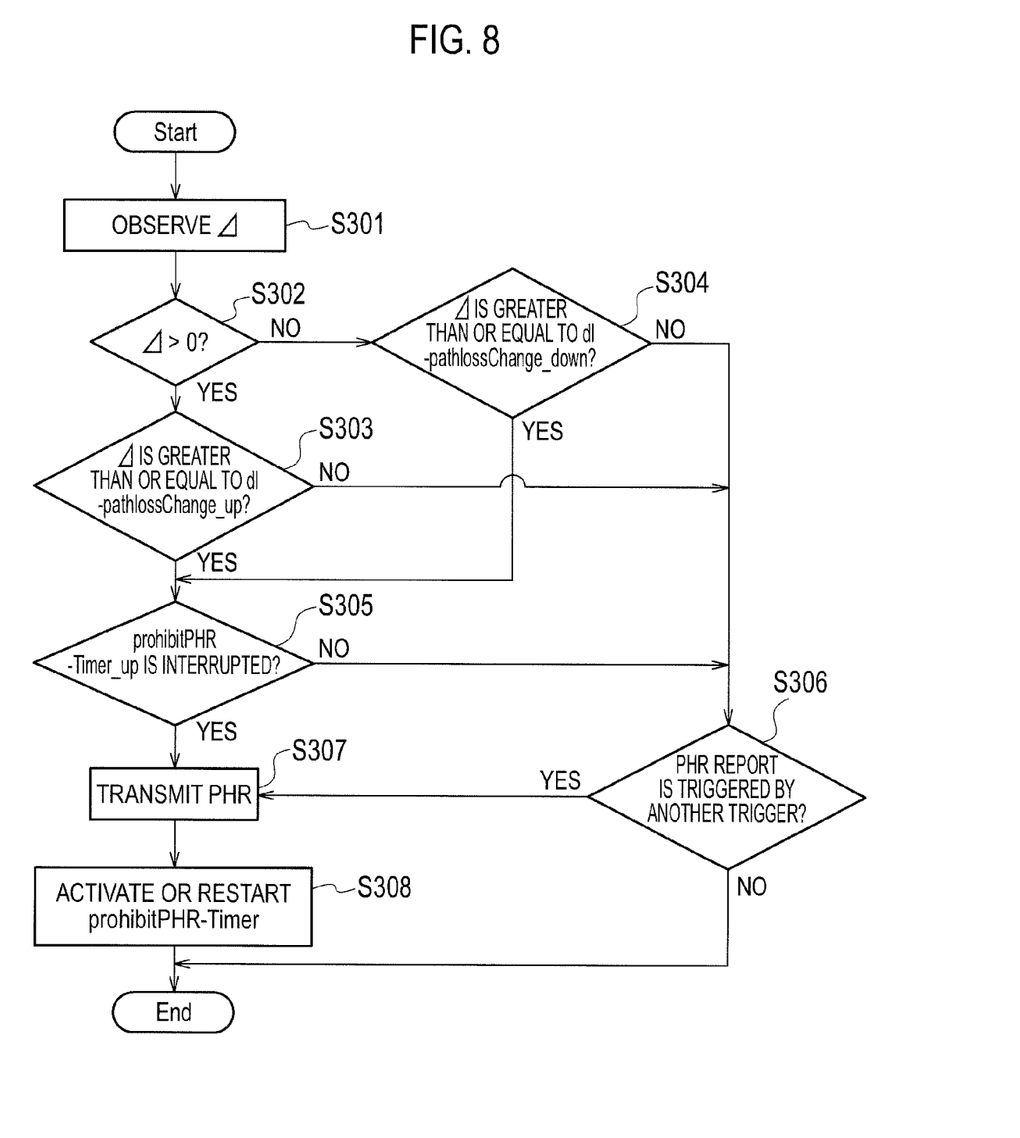
FIG. 8 is a flowchart illustrating the operation of the mobile station according to the second modification of the present invention.

As illustrated in FIG. 8, the mobile station UE observes the variation Δ in transmission power in the second communication or the variation Δ in P-MPR (and "$P_{CMAX,c}(i)$") compared with the value in finally transmitting the PHR in Step S301, and the mobile station UE determines whether the variation Δ is greater than "0" in Step S302.

The operation goes to Step S303 in the case of "YES", and the operation goes to Step S304 in the case of "NO".

In Step S303, the mobile station UE determines whether the variation Δ exceeds "dl-PathlossChange_up".

The operation goes to Step S305 in the case of "YES", and the operation goes to Step S306 in the case of "NO".

In Step S304, the mobile station UE determines whether the variation Δ is exceeds "dl-PathlossChange_down".

The operation goes to Step S305 in the case of "YES", and the operation goes to Step S306 in the case of "NO".

In Step S305, the mobile station UE determines whether "prohibitPHR-Timer" is interrupted.

The operation goes to Step S307 in the case of "YES", and the operation goes to Step S306 in the case of "NO".

In Step S306, the mobile station UE determines whether the PHR should be transmitted by another trigger (for example, the periodic transmission trigger of the PHR, and the transmission trigger in the case that the PHR function is activated).

The operation goes to Step S307 in the case of "YES", and the operation is ended in the case of "NO".

In Step S307, the mobile station UE transmits the PHR to the radio base station eNB.

In Step S308, "prohibitPHR-Timer" is activated (or restarted).

In FIG. 8, Step S307 may be performed after Step S308. In FIG. 8, Step S303 or S304 may be performed after Step S305.

According to the mobile communication system of the second modification of the present invention, the possibility of frequently generating the data error caused by performing the transmission in the transmission format in which the mobile station UE is improper can be avoided using "dl-PathlossChange_up" and "dl-PathlossChange_down", in which the values differ from each other.

Specifically, according to the mobile communication system of the second modification of the present invention, the transmission of the PHR is facilitated when the transmission power in the second communication or the P-MPR (and "$P_{CMAX,c}(i)$") increases, and the transmission of the PHR is made difficult when the transmission power in the second communication or the P-MPR (and "$P_{CMAX,c}(i)$") decreases.

The features of the embodiment may be expressed as follows.

The first feature of the embodiment is the mobile station UE configured to be able to simultaneously conduct the first communication through the RAT#1 (the first radio access network) and the second communication through the RAT#2 (the second radio access network), the mobile station UE including the PHR transmission unit 11 (the reporting unit) configured to transmit the PHR to the RAT#1 (that is, to report the surplus transmission power of the mobile station) and the timer management unit 12 configured to manage "prohibitPHR-Timer_up (the first timer)" and "prohibitPHR-Timer_down (the second timer)", "prohibitPHR-Timer_up" and "prohibitPHR-Timer_down" being activated when the PHR is transmitted, wherein the PHR transmission unit 11 is configured to transmit the PHR to the RAT#1 when "prohibitPHR-Timer_up" is interrupted and when the increment in transmission power in the second communication, the increment in P-MPR (the maximum transmission power reduction value determined based on the transmission power in the second communication), the increment in MPR, the increment in A-MPR, the decrement in "$P_{CMAX,c}(i)$" by the P-MPR, the decrement in "$P_{CMAX,c}(i)$" by the MPR, or the decrement in "$P_{CMAX,c}(i)$" by the A-MPR exceeds "dl-PathlossChange (the predetermined amount)" compared with the value in finally transmitting the PHR, the PHR transmission unit 11 is configured to transmit the PHR to the RAT#1 when "prohibitPHR-Timer_down" is interrupted and when the decrement in transmission power in the second communication, the decrement in P-MPR, the decrement in MPR, the decrement in A-MPR, the increment in "$P_{CMAX,c}(i)$" by the P-MPR, the increment in "$P_{CMAX,c}(i)$" by the MPR, or the increment in "$P_{CMAX,c}(i)$" by the A-MPR exceeds "dl-PathlossChange" compared with the value in finally transmitting the PHR, and "prohibitPHR-Timer_up" is configured to be ended in the period shorter than that of "prohibitPHR-Timer_down".

The second feature of the embodiment is the mobile station UE configured to be able to simultaneously conduct the first communication through the RAT#1 and the second communication through the RAT#2, the mobile station UE including the PHR transmission unit 11 configured to transmit the PHR to the RAT#1 and the timer management unit 12 configured to manage "prohibitPHR-Timer (the timer)", "prohibitPHR-Timer" being activated when the PHR is transmitted, wherein the PHR transmission unit 11 is configured not to transmit the PHR to the RAT#1 when "prohibitPHR-Timer_up" is activated, and the PHR transmission unit 11 is configured to transmit the PHR to the RAT#1 when the state in which the decrement in transmission power in the second communication, the decrement in P-MPR, the decrement in MPR, the decrement in A-MPR, the increment in "$P_{CMAX,c}(i)$" by the P-MPR, the increment in "$P_{CMAX,c}(i)$" by the MPR, or the increment in "$P_{CMAX,c}(i)$" by the A-MPR exceeds "dl-PathlossChange" compared with the value in finally transmitting the PHR, continues for the period (the predetermined period) of the TTT, even if "prohibitPHR-Timer" is interrupted.

The third feature of the embodiment is the mobile station UE configured to be able to simultaneously conduct the first communication through the RAT#1 and the second communication through the RAT#2, the mobile station UE including the PHR transmission unit 11 configured to transmit the PHR to the RAT#1 and the timer management unit 12 configured to manage "prohibitPHR-Timer", "prohibitPHR-Timer" being activated when the PHR is transmitted, wherein the PHR transmission unit 11 is configured to transmit the PHR to the RAT#1 when "prohibit PHR-Timer" is interrupted and when the increment in transmission power in the second communication, the increment in P-MPR (the maximum transmission power reduction value determined based on the transmission power in the second communication), the increment in MPR, the increment in A-MPR, the decrement in "$P_{CMAX,c}(i)$" by the P-MPR, the decrement in "$P_{CMAX,c}(i)$" by the MPR, or the decrement in "$P_{CMAX,c}(i)$" by the A-MPR exceeds "dl-PathlossChange_up (the first predetermined amount)" compared with the value in finally transmitting the PHR, the PHR transmission unit 11 is configured to transmit the PHR to the RAT#1 when "prohibit PHR-Timer" is interrupted and when the decrement in transmission power in the second communication, the decrement in P-MPR, the decrement in MPR, the decrement in A-MPR, the increment in "$P_{CMAX,c}(i)$" by the P-MPR, the increment in "$P_{CMAX,c}(i)$" by the MPR, or the increment in "$P_{CMAX,c}(i)$" by the A-MPR exceeds "dl-PathlossChange_down (the second predetermined amount)" compared with the value in finally transmitting the PHR, and "dl-PathlossChange_up" is configured to be smaller than "dl-PathlossChange_down".

The operation of the radio base station eNB, the mobile station UE or the like may be performed by hardware, a software module executed by a processor, or a combination thereof.

The software module may be provided in any storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor such that the processor can write and read information in and from the storage medium. The storage medium may be integrated in the processor. The storage medium and the processor may be provided in an ASIC. The ASIC may be provided in the radio base station eNB, the mobile station UE, or the like. The storage medium and the processor may be provided as a discrete component in the radio base station eNB, the mobile station UE, or the like.

Although the present invention is described in detail using the embodiment, it is clear for those skilled in the art that the present invention is not limited to the embodiment. Various corrections and changes can be made without departing from the spirit and the scope of the present invention. Accordingly, the description is aimed only at the illustration, and the description has no restrictive meaning to the present invention.

REFERENCE SIGNS LIST

UE: Mobile station
11: PHR transmission unit
12: Timer management unit
13: Determination unit

The invention claimed is:

1. A mobile station comprising:
   a reporting unit configured to report a surplus transmission power of the mobile station; and
   a timer management unit configured to manage a timer, the timer being activated when the surplus transmission power is reported,
   wherein the reporting unit is configured not to report the surplus transmission power when the timer is activated, and
   the reporting unit is configured to report the surplus transmission power, when the timer is interrupted, and when a state in which a decrement in transmission power or a decrement in maximum transmission power reduction value determined based on the transmission power continually exceeds a predetermined amount for a time to trigger compared with a value in finally reporting the surplus transmission power.

2. The mobile station according to claim 1, wherein the reporting unit is configured to continuously monitor the time to trigger.

3. The mobile station according to claim 1, wherein the reporting unit is configured to discretely monitor the time to trigger.

* * * * *